Patented Nov. 3, 1931

1,829,746

UNITED STATES PATENT OFFICE

DOUGLAS M. HARRISON, OF EAST ST. LOUIS, ILLINOIS, ASSIGNOR, BY MESNE ASSIGNMENTS, TO McKENZIE MORTAR COMPANY, OF PITTSBURGH, PENNSYLVANIA

HARDENING AND WATERPROOFING COMPOSITION FOR LIME AND THE LIKE PRODUCTS

No Drawing.   Application filed January 17, 1925.   Serial No. 3,090.

This invention relates to a hardening composition and a hardening and water-proofing composition particularly adapted to be mixed with lime products to be set up and used as plaster, mortar, stucco and the like for accelerating the setting of the product, for increasing the ultimate hardness of the same, or water-proofing the same respectively. Whenever lime or lime-like products are used and it is desired to increase the hardening thereof and particularly hasten the initial setting, the composition as indicated can be employed and the amount thereof or proportions thereof may be varied as desired, depending upon the degree of acceleration and final hardness desired within the reasonable limits of operation.

Lime consists essentially of calcium oxide formed from limestone generally, and in the utilization of the lime it is slaked by the addition of water, forming calcium-hydroxide, which changes to the carbonate upon standing by reason of the action of carbon dioxide and water forming carbonic acid and penetrating the material including the lime hydroxide, and carbonating the same with the resultant discharge of water. In practice the plaster, mortar or stucco is formed with sand or other filler material and this sand gives not only mass to the material but also makes the resultant product somewhat porous, thereby permitting the air to have access to the interior. The lime product, such as plaster and the like, ultimately dries out with the surface layer carbonated into calcium carbonate or hardened, while the remainder is a mere crumbling mixture of sand and lime.

When other products are utilized, as before mentioned, other types of hardening may occur. Many of the lime substitute materials which may or may not include calcium are not commercially adaptable without special treatment for use as plaster or mortar, since it takes considerable time for the products including the before mentioned materials, to harden and set. Therefore there must be mixed with them in order to accelerate the hardening, additional ingredients. For example gypsum has heretofore been added to lime materials in order to accelerate their setting and hardening, the amount thereof depending upon the particular grade of lime used in the mortar, plaster or the like. Similarly other accelerators are utilized.

The present invention seeks to secure the setting action in a relatively short time, preferably within a few hours and generally less than a day by the addition of a hardening composition which also accelerated the rate of and increases the final amount of hardening. Furthermore, when desired, the lime product material such as plaster, etc., may be water-proofed by the addition of sufficient water-proofing and thus the resultant lime product will be water-proofed, as well as hardening in a quicker time than the untreated material and to a greater extent.

The chief feature of the invention consists in mixing a special or standard lime water-proofing material with calcium chloride as an accelerator, and to the same there is also added roll scale or iron filings as an activating agent which prevents cracking of the resultant products, such as plaster and the like.

If desired, as another feature of the invention, there may be added a carbonate.

The invention consists in utilizing a lime product or plaster water-proofing material preferably in the form of powder wherein the major constituent is of a suitable material that may or may not be the same as the active material of the product such as lime or mortar to which the resultant hardening composition is to be added.

Herein a satisfactory lime product water-proofing product is in the form of a powder and may be prepared by mixing about ten parts of a fatty material, such as one or more of the fatty acids, with about one hundred parts of lime. The resultant mixture is a dry powder which comprises the usual lime product water-repellent or water-proofing product or composition. However, the above mentioned fatty materials are not the only products capable of use in this connection.

It is to be understood that the fatty acids, such as margaric, oleic and stearic are satisfactory, and not only are the lime compounds thereof satisfactory, but also other compounds are similarly satisfactory although probably not as cheap.

To the resultant water-repellent mixture, or to such an equivalent prepared or identical mixture which is commercially available, there is added a suitable material as calcium chloride which is a deliquescent salt. Likewise another suitable material, although more expensive, is aluminum fluoride. A mixture thereof likewise is suitable. Furthermore, other water-absorbing or deliquescent halogen salts might be added to the foregoing ingredients or may be substituted therefor without departing from the broader feature of the invention.

The following have been experimented with and have been produced with satisfactory results, although not as satisfactory as calcium chloride, activity, economy and stability being the determining factors. These are magnesium chloride, ferric chloride, hydrous magnesium chloride, hydrous potassium-magnesium chloride, hydrous calcium magnesium chloride, sodium magnesium chloride and sodium-aluminum chloride commonly called "cryolite".

Herein about one part of the salt is mixed with about one part of the water-proofing powder, previously described. If desired, the mixture may be varied at least to the extent that about one-half to one part of the water-proofing material may be utilized to about four parts of the accelerator. Generally the amount of water-proofing added should be at least sufficient to prevent the deliquescent salt from absorbing moisture when in inactive position, that is, when not incorporated with the lime or equivalent material in the process of positioning and hardening. Calcium chloride and some of the other salts mentioned usually are commercially obtainable in lumps, and the same thereupon are reduced or pulverized while mixed with the water-proofing. This prevents absorption of moisture upon the part of the accelerator during reduction and keeps the resultant mixture dry while in storage.

In the slaking of lime heat is generated and while it is not known what the exact reaction is; it is suggested for a reasonable understanding of the operation of the waterproofer when mixed with the lime product that an insoluble calcium soap is formed which is intimately mixed throughout the lime product and the like and waterproofs the same to a greater or less extent.

For the purpose of preventing cracking of the plaster product and the like during and after setting, a suitable material is added to the dry powder mixture and thoroughly mixed and incorporated therewith. This material may be of several different kinds, such as metallic dust, particularly iron dust or roll scale or some other similarly cheap but suitable constituent.

To assist in drying and in hardening, and in certain instances to actually enter into a final formation, there may be added an alkaline earth or metal carbonate material which may be a mixture or a single product such as potassium carbonate. The addition of this material to the mixture activates the action of the same and furthermore not only reduces the time and increases the hardness, but seems to harden in character approaching hydraulic cement. Possibly this material, potassium carbonate acts as a catalytic agent, or it may be that the potassium carbonate reacts with the calcium soap and forms a compound calcium potassium soap. It is not known what the definite action is but it is known that the addition of potassium carbonate reduces the setting and initial hardening period to a few hours, and secures the aforesaid additional hardening action mentioned.

It has been determined that to the previously described mixture of water-proofer calcium chloride or similar material and suitable metallic dust material, there may be added about one-third of the activating carbonate, so that the resultant mixture will contain approximately one part each of the foregoing.

In arriving at the amount of the various ingredients to be mixed, it is not the purpose herein to limit this invention to any specific proportion, for these proportions may be varied within limits according to the purpose and desires of the user. The proportions of the various materials in the mixture will probably be varied for different geographical locations, as well as for different products to which the mixture is added.

However, approximate proportions have been set forth above, and the general controlling conditions may be briefly stated as follows: It is preferably desirable for minimum satisfactory operation to incorporate in the resultant hardening compound only sufficient water-proofer to normally maintain the compound in a relatively dry or powder condition. Likewise, it is preferably desirable to incorporate at least a sufficient amount of the suitable metallic dust material which will perform its function, although more may be included if desired.

In its application, the resultant compound may be mixed with lime or mortar material and the like when the latter is manufactured, or when the latter is mixed with other materials to form mortar, plaster and the like. It has been determined that anywhere from one-tenth of one per cent to ten per cent of the hardening composition may be mixed in the product to be hardened, the proportion depending upon the degree of hardness desired, and the quickness of setting and hardening. However, these proportions also could be varied according to the length of time in which the user wishes the hardening process to continue, and according to the degree of hardness the user desires in the resultant product.

The use of the foregoing materials in the manner set forth obtains a hardening action and also an acceleration in the hardening or setting which can be regulated by the variation in the proportions of the two active ingredients, to wit, calcium chloride and the roll scale or their equivalents as set forth hereinbefore. There is a chemical reaction between the active ingredients of the hardening composition above specified when used in conjunction with a product having as its major bonding constituent hydrated lime or its equivalent to form a lime product such as plaster, mortar and the like. This chemical reaction is not well understood but what seems to be a plausible explanation is that the calcium chloride in some way induces a hydraulic hardening of the lime product (possibly due to colloidal action or hydration or both, or possibly due to a combined action of the carbon-dioxide and water) which hardening is accelerated by the use of these several active ingredients in predetermined proportions. A distinction should be made, however, that the use of the hardener with or without the water-proofer in the preparation of a lime product, does not accelerate the drying of the product; in fact, the reverse apparently is true, and for that reason it may be possible that the retention of the moisture to a greater extent than heretofore obtained permits the carbonation to continue beyond that which normally would result prior to drying with the ordinary lime products, and this may be chiefly due to the calcium chloride, and possibly the increased rate of carbonation is due to the roll scale or accelerator which, as heretofore stated, has the additional property of preventing cracking of the plaster or lime product.

In the claims where calcium chloride and roll scale are set forth, it is to be understood that the equivalent products hereinbefore enumerated are considered the equivalents thereof and the claims are to be interpreted accordingly.

The invention claimed is:

1. A composition for accelerating the hardening of and for obtaining increased final hardness in commercial lime content products that harden by carbonation and which are suitable for plaster, stucco and mortar, said composition including powdered calcium chloride, and comminuted roll scale reactive in the presence of the aforesaid lime content and water for the purpose set forth.

2. A composition for accelerating the hardening of and for obtaining increased final hardness in commercial lime content products that harden by carbonation and which are suitable for plaster, stucco and mortar, said composition including powdered calcium chloride, comminuted roll scale reactive in the presence of the aforesaid lime content and water for the purpose set forth, and a water proofing material suitable for water proofing the lime plaster stucco or mortar and in sufficient amount to render said calcium chloride sufficiently inactive to prevent reaction between said roll scale and said calcium chloride until mixed with water for lime putty preparation.

3. A composition for accelerating the hardening of and for obtaining increased final hardness in commercial lime content products that harden by carbonation and which are suitable for plaster, stucco and mortar, said composition including powdered calcium chloride, comminuted roll scale reactive in the presence of the aforesaid lime content and water for the purpose set forth, said chloride and said roll scale being substantially equal in amount, and the addition of potassium carbonate thereto in an amount approximately equal to 50% of the chloride and the scale.

4. A composition for accelerating the hardening of and for obtaining increased final hardness in commercial lime content products that harden by carbonation and which are suitable for plaster, stucco and mortar, said composition including powdered calcium chloride, comminuted roll scale reactive in the presence of the aforesaid lime content and water for the purpose set forth, a water proofing material suitable for water proofing the lime plaster stucco or mortar and in sufficient amount to render said calcium chloride sufficiently inactive to prevent reaction between said roll scale and said calcium chloride until mixed with water for lime putty preparation, said roll scale, said chloride and said water proofer being substantially equal in amount, and potassium carbonate in an amount equal to approximately one-third of the scale, chloride and water proofer.

5. A composition as defined by claim 4 wherein the amount of calcium chloride is at least equal to that of the roll scale.

6. A lime putty suitable for plaster, stucco or mortar, or the like, including a calcium content of slaked lime or the like in considerable amounts and which hardens by carbonation, powdered calcium chloride and comminuted roll scale, the roll scale and calcium chloride being not more than 10% of the calcium content.

7. A lime putty suitable for plaster, stucco or mortar, or the like, including a calcium content of slaked lime or the like in considerable amounts and which hardens by carbonation, powdered calcium chloride, comminuted roll scale, and potassium carbonate, said carbonate, scale and chloride being substantially equal in amount and the same being not more than 10% of the calcium content.

8. A lime composition suitable for plaster, mortar, or the like, of the character defined by claim 6 characterized by the addition of a waterproofer for a lime plaster, mortar or stucco and in an amount sufficient to prevent deliquescence of the powdered calcium chloride until subjected to water in the preparation of lime putty.

In witness whereof, I have hereunto affixed my signature.

DOUGLAS M. HARRISON.